United States Patent [19]

Reasoner

[11] Patent Number: 5,577,415
[45] Date of Patent: Nov. 26, 1996

[54] NON-BUCKLING CORE ELEMENT CONNECTOR WITH SNAP-RING

[75] Inventor: Michael Reasoner, Ortonville, Mich.

[73] Assignee: Teleflex Incorporated, Plymouth Meeting, Pa.

[21] Appl. No.: 521,125

[22] Filed: Aug. 29, 1995

[51] Int. Cl.$^6$ ..................................................... F16C 1/14
[52] U.S. Cl. ................. 74/502.4; 403/327; 403/DIG. 7; 74/502.6
[58] Field of Search .............................. 74/502.4, 502.6, 74/502; 403/DIG. 7, 327, 300, 294

[56] References Cited

U.S. PATENT DOCUMENTS

| | | | |
|---|---|---|---|
| 2,517,705 | 8/1950 | Paquin | 74/502.4 X |
| 4,654,951 | 4/1987 | Myer | 403/DIG. 7 X |
| 4,930,932 | 6/1990 | LeVahn | 403/327 X |
| 5,039,138 | 8/1991 | Dickirson . | |
| 5,509,750 | 4/1996 | Boike | 74/502.4 X |

FOREIGN PATENT DOCUMENTS 665752 10/1938 Germany ............................. 403/327

*Primary Examiner*—Vinh T. Luong
*Assistant Examiner*—Mary Ann Battista
*Attorney, Agent, or Firm*—Howard & Howard

[57] ABSTRACT

A connection for locking first (18) and second (20) core element sections together in a locked position mechanically prevented from moving relative to one another axially in either direction solely in response to axial forces transmitted along the core element sections (18,20) without buckling either of the core element sections (18,20). A male member (26) presents a male groove (30) and a female member (24) presents a female groove (32) and a lock ring (28) disposed in one of the grooves (30,32) with the lock ring (28) radially overlapping the male (30) and female (32) grooves in the locked position. A mechanical advantage comprising a female taper (34) of gentle slope forces the radial movement of the lock ring (28) as core element sections (18 and 20) are moved together without buckling the wire elements (22) of the core element sections (18, 20).

6 Claims, 3 Drawing Sheets

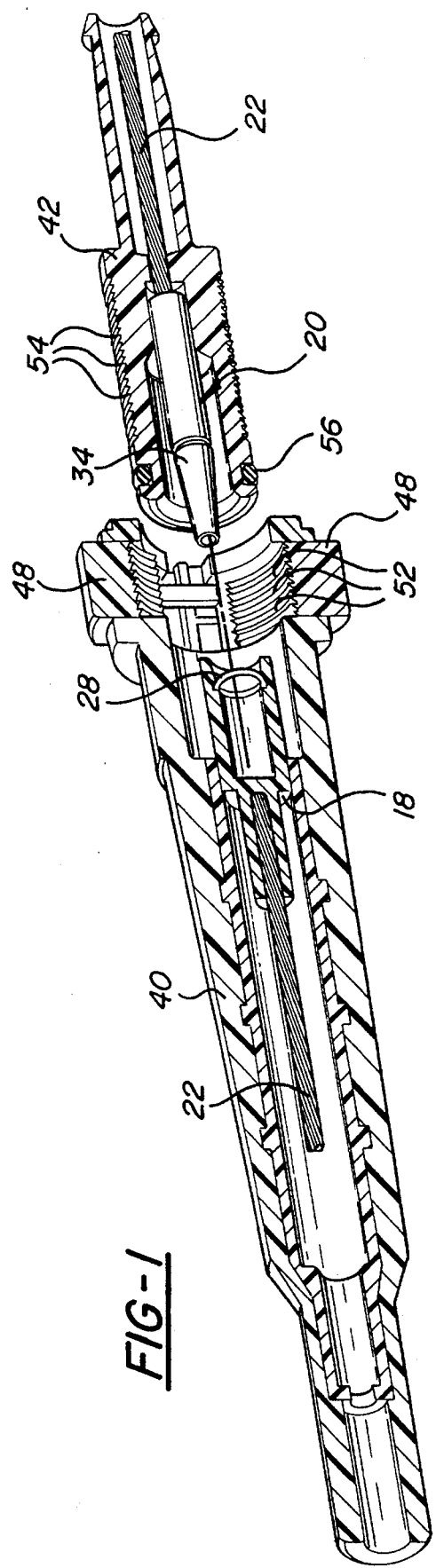
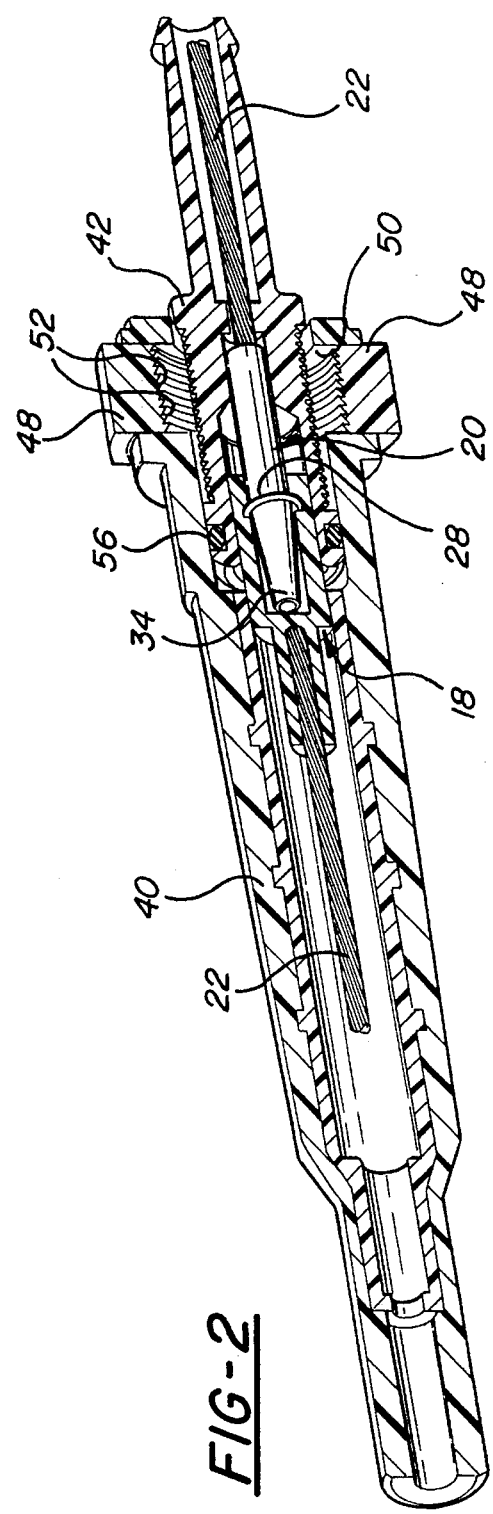
FIG-1
FIG-2

NON-BUCKLING CORE ELEMENT CONNECTOR WITH SNAP-RING

TECHNICAL FIELD

The subject invention relates to a remote control assembly of the type for transmiting motion in a curved path by a flexible motion transmitting core element. More specifically, the invention relates to such a control assembly assembly is manufactured in two axially separate parts which are mated during installation.

BACKGROUND ART

Such remote control assemblies are used in automotive vehicles. For example, a remote control assembly may interconnect the accelerator pedal and the fuel flow control system in an automobile. In numerous installations it is necessary to attach the outward ends of the two halves to support structure before the routing of the conduit can be completed. Such assemblies are divided into a first guide or conduit movably supporting a first core element section and a second guide or conduit movably supporting a second core element section with means for connecting the core element sections togetrher and the two conduits together. However, it frequently occurs that there is insufficient space in the enviroment to manually connect the conduits and core element sections together or the conduits must be aligned and/or conected before the core element sections are forced together. In forcing the core element sections together, the forces must not be sufficient to buckle the core element sections. An assembly for connecting such an assembly together is disclosed in U.S. Pat. No. 5,039,138 in the name of G. D. Dickerson. There remains a need for such an assembly wherein the assembly forces do not buckle the core element sections but at the same time provide a positive lock against relative axial movement in either direction between the two core element sections during normal operation.

SUMMARY OF THE INVENTION

A motion transmitting remote control assembly of the type for transmitting motion in a curved path comprising a guide means defined by first and second guide lengths with a first core element section movably supported in the first guide length and a second core element section movably supported in the second guide length. The assembly is characterized by connection means for locking said first and second core element sections together in a locked position mechanically prevented from moving relative to one another axially in either direction solely in response to axial forces transmitted along the core element sections without buckling either of the core element sections.

BRIEF DESCRIPTION OF THE DRAWINGS

Other advantages of the present invention will become readily appreciated as the same becomes better understood by reference to the following detailed description when considered in connection with the accompanying drawings wherein:

FIG. 1 is a perspective view in cross section showing a preferred embodiment of the subject invention in the pre-assembled condition;

FIG. 2 is a view like FIG. 1 in an assembled condition but prior to being locked;

DETAILED DESCRIPTION OF PREFERRED EMBODIMENT

Figure 3:
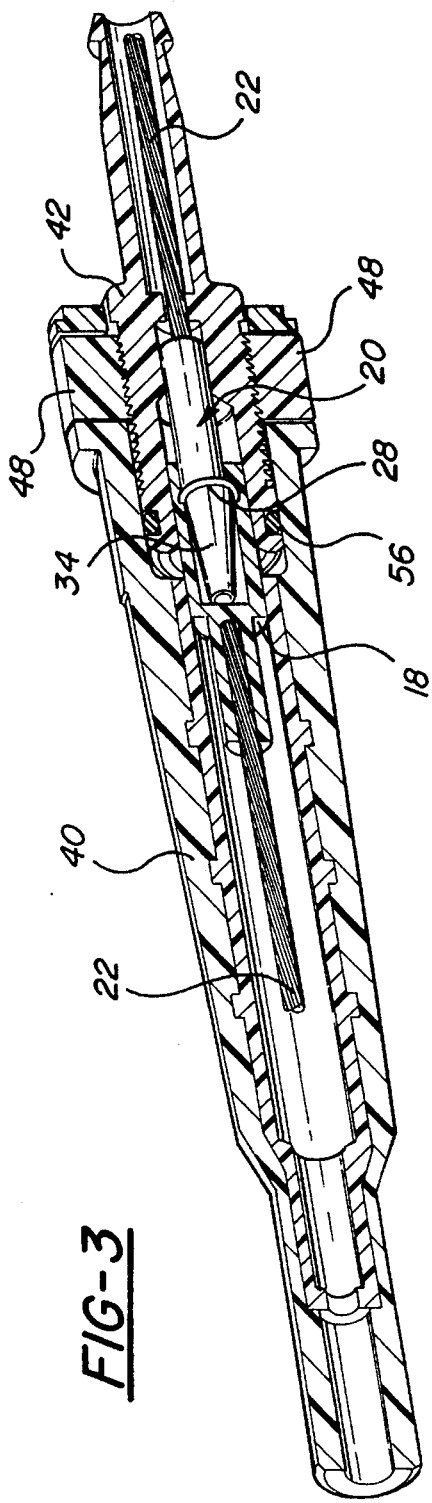
FIG. 3 is a view like FIGS. 1 and 2 in the assembled and locked condition.
Figure 4:
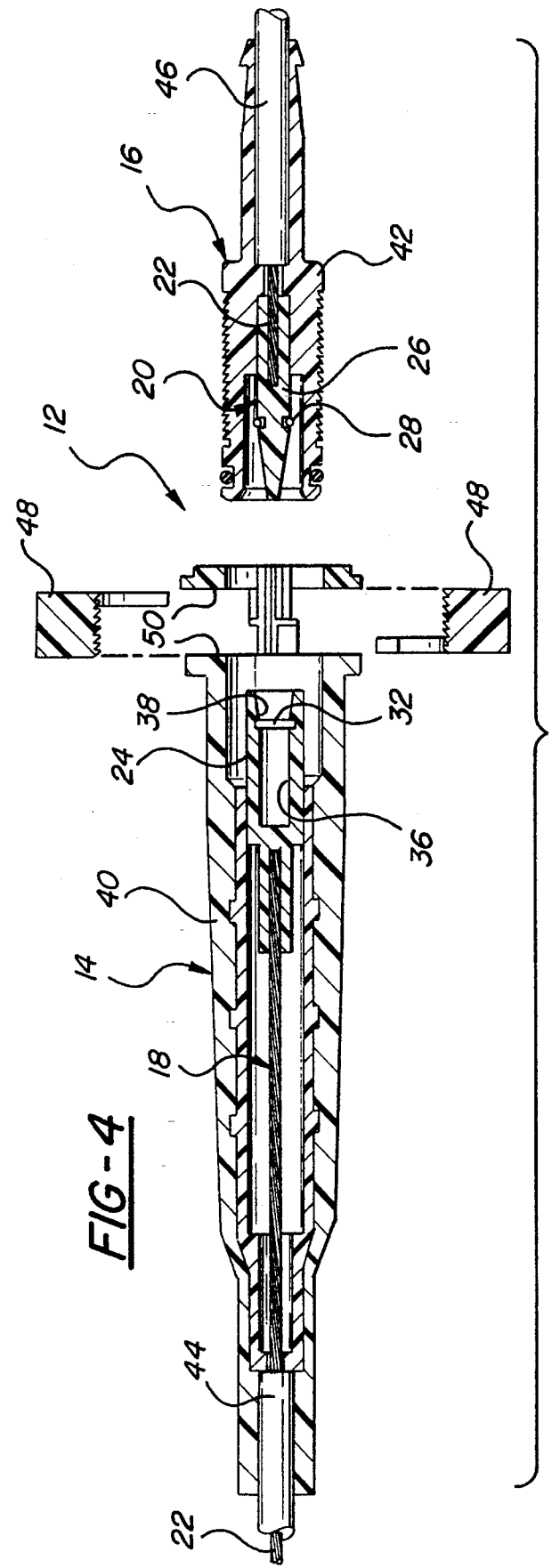
FIG. 4 is a cross sectional view in the pre-assembled condition shown in FIG. 1 but showing the conduit.
Figure 5:
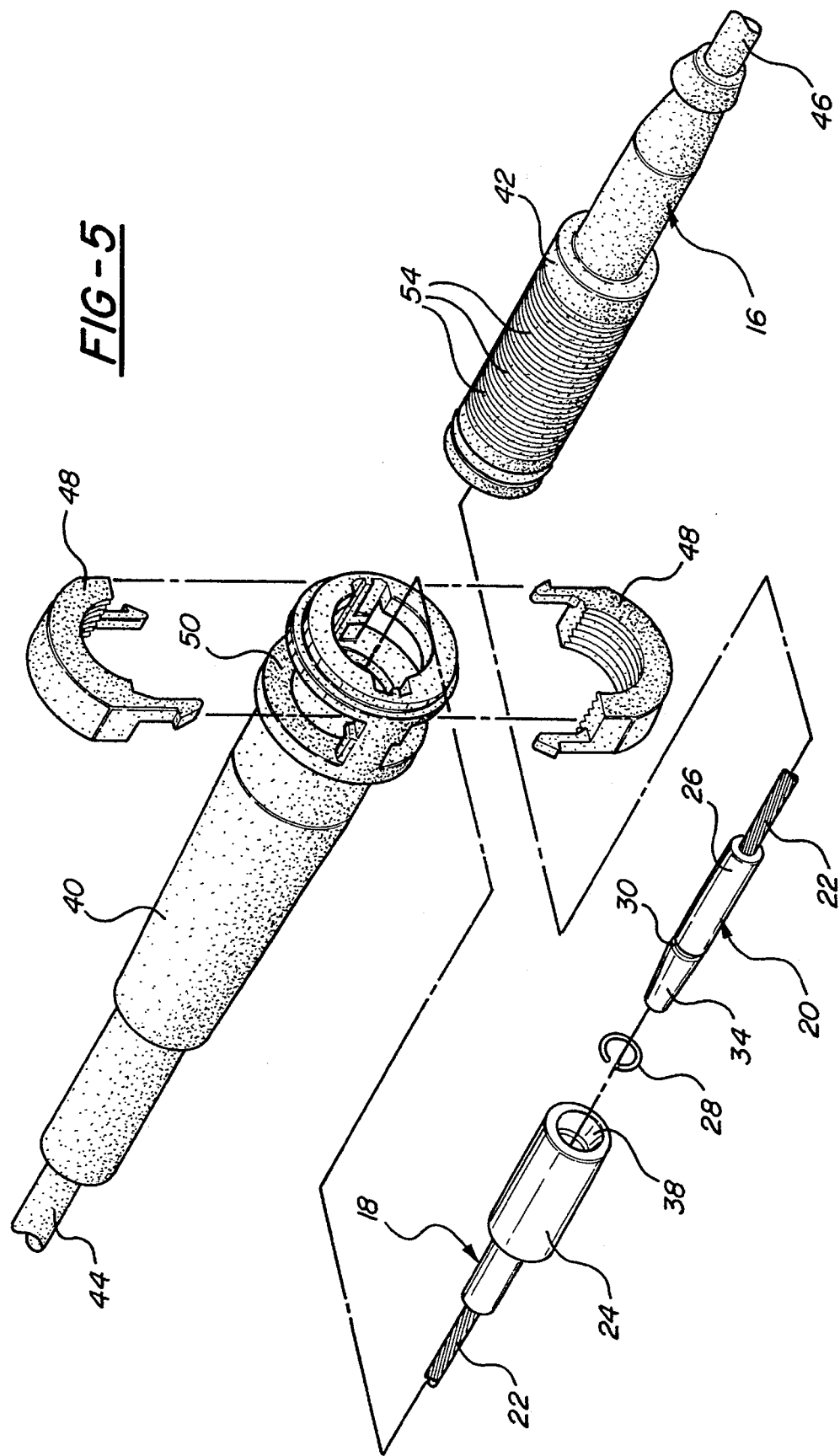
FIG. 5 is an exploded perspective view but from the opposite end from the view of FIG. 1.

A motion transmitting remote control assembly of the type for transmitting motion in a curved path is generally shown at 12.

The assembly 12 comprises a flexible core element and a guide means for movably supporting the core element. The guide means is defined by first and second guide lengths, generally indicated at 14 and 16, respectively.

The core element is defined by a first core element section, generally indicated at 18, movably supported in the first guide length 14 and a second core element section, generally indicated at 20, movably supported in the second guide length 16. As is well known in the art, the core element sections include wire-like components 22, with the wire-like element of the first section 18 anchored to a female member 24, which defines the end of the first core element section 18, and the wire-like element of the second section 20 anchored to a male member 26, which defines the end of the second core element section 20. The female 24 and male 26 members define connection means for locking the first 18 and second 20 core element sections together in a locked position mechanically prevented from moving relative to one another axially in either direction solely in response to axial forces transmitted along the core element sections 18 and 20 without buckling either of the wire-like elements 22 of the core element sections 18 and 20. This connection means includes a lock element 28 for locking the core element sections 18 and 20 in the locked position and mechanical advantage means for moving the lock element 28 to the locked position with less force than required to buckle the wire-like elements 22 of the core element sections 18 and 20 as the core element sections 18 and 20 are moved together by forces transmitted along the wire-like elements 22 of the core element sections 18 and 20. The male member 26 presents a male groove 30 and the female member 24 member 24 presents a female groove 32. The lock element 28 comprises a lock ring disposed in one of the grooves 30 or 32. The lock ring 28 radially overlaps the male 30 and female 32 grooves in the locked position, but initially may be disposed in either groove 30 or 32.

The lock ring 28 is radially contractible or expandable from a steady state condition and the mechanical advantage means radially contracts or expands the lock ring 28 as the core element sections 18 and 20 are moved together. The mechanical advantage means comprises a female taper 34 of gentle slope for forcing the radial contraction of the lock ring 28 as the core element sections 18 and 20 are moved together. The female member 24 presents an end with a bore 36 extending thereinto for receiving the male member 26. The female groove 32 is disposed in the bore 36 and a female taper 38 extends from the end thereof to the female groove 32. The male member 26 presents a conical nose defining the taper 34 for guiding the male member 26 into the bore 36 of the female member 24. The slope of the conical nose 34 is closer to the axis of the core element sections 18 and 20 than the slope of the female taper 38.

The assembly 12 also includes coupling means for connecting the first 14 and second 16 guide lengths together prior to locking the core element sections 18 and 20 together. The first guide length 14 includes a first fitting 40 slidably supporting the female member 24 and limiting radial movement of the female member 24 during such sliding movement. The second guide length 16 includes a second fitting 42 slidably supporting the male member 26 and limiting radial movement of the male member 26 during such sliding movement so that the nose 34 is prevented from engaging the end of the female member 24 when the guide lengths 14 and 16 are coupled together and the core element sections 18 and 20 are moved together.

As also known in the art, the first guide length 14 includes a first conduit 44 extending from the first fitting 40 and the second guide length 16 includes a second conduit 46 extending from the second fitting 42. The first 40 and second 42 fittings telescope together and the coupling means includes a pair of latch members 48 for manual movement radially to a latched position to adjust and then prevent relative axial movement between the first 40 and second 42 fittings. More specifically, first fitting 40 presents a pocket 50 for slidably supporting the latch member 48 for radial movement between latched and unlatched positions. In the lathed position, the latch members 48 present teeth 52 which engage teeth 54 on the second fitting 42 to prevent the relative axial movement. Each latch member 48 coacts with a detent on the first fitting 40 to hold the latch member 48 in the latched position.

The conduits 44 and 46 are of the well known type including an inner tubular member made of organic polymeric material and surrounded by long lay wires wrapped helically around the inner tubular member and encased in an extruded casing, also of organic polymeric material. The fittings 40 and 42, as well as the female and male members 24 and 26, are also of an organic polymeric material, but a rigid material. An O-ring 56 is disposed in a groove in the fitting 42 for sealing the interior passages of the fittings against the ingress of foreign matter.

During installation, the opposite ends of the guide lengths 14 and 16 may be attached to support structure and then the first and second fitting telescoped together without the latch member 48 being moved to the latched position. While in this condition, the outward ends of the wire-like core elements 22 may be moved toward one another. When the wire-like core elemets are moved together, the nose 34 is guided by its sliding snug fit in the bore in the fitting 42 into the center of the female taper 38 of the bore 36 in the female member 24. The taper 34 is so gentle that it provides a mechanical advantage for radially expanding the lock ring 28 until the two grooves 30 and 32 are axially aligned at which position the snap ring 28 returns to its natural state in radially overlapping relationship with the sides of both of the grooves 30 and 32. In this radial overlapping postion of the grooves 30, 32 and the lock ring 28, the core element sections 18 and 20 are locked together to move axially together without relative axial movement therebetween in either axial direction. Such a connection prevents undesirable lengthening or shortening of the entire core element during operation and wear. Thereafter the latch may be moved to the latched position to prevewnt relative axial movement between the guide lenths 14 and 16.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A motion transmitting remote control assembly (12) for transmitting motion in a curved path, said assembly (12) comprising:

a first guide length (14) and a second guide length (16);

a first core element section (18) movably supported in said first guide length (14);

a second core element section (20) movably supported in said second guide length (16); and characterized by connection means for locking said first (18) and second (20) core element sections together in a locked position mechanically prevented from moving relative to one another axially in either direction, said connection means including a female member (24) attached to an end of said first core element section (18) and a male member (26) attached to an end of said second core element section (20), said male member (26) presenting a male groove (30) and said female member (24) presenting a female groove (32), a lock ring (28) disposed in one of said grooves (30,32), said lock ring (28) radially overlapping said male (30) and female (32) grooves in said locked position, said lock ring (28) being radially expandable and contractible from a steady state condition, and said male member presenting a male taper (34) of gentle slope for radially expanding said lock ring (28) as said core element sections (18 and 20) are moved together, said female member (24) presenting an end with a bore (36) extending thereinto for receiving said male member (26), said female groove (32) being disposed in said bore (36) and including a female taper (38) having a slope extending from said end to said female groove (32), said slope of said male taper being more gentle than said slope of said female taper (38).

2. An assembly as set forth in claim 1 including coupling means for connecting said first (14) and second (16) guide lengths together prior to locking said core element sections (18,20) together.

3. An assembly as set forth in claim 2 wherein said male member (26) presents a conical nose (34) having a slope for guiding said male member (26) into said female taper (38) of said bore (36) of said female member (24).

4. An assembly as set forth in claim 7 wherein said first guide length (14) includes a first fitting (40) slidably supporting said female member (24) and limiting radial movement of said female member (24) during such sliding movement and said second guide length (16) includes a second fitting (42) slidably supporting said male member (26) and limiting radial movement of said male member (26) during such sliding movement so that said nose (34) is prevented from engaging the end of said female member (24) when said guide lengths (14,16) are coupled together and said core element sections (18,20) are moved together.

5. An assembly as set forth in claim 4 wherein said first guide length (40) includes a first conduit (44) extending from said first fitting (40) and said second guide length (42) includes a second conduit (46) extending from said second fitting (42).

6. An assembly as set forth in claim 5 wherein said first (40) and second (42) fittings telescope together and said coupling means includes a latch member (48) for manual movement to a latched position to adjust and then prevent relative axial movement between said first (40) and second (42) fittings.

* * * * *